United States Patent [19]
Sodos et al.

[11] Patent Number: 5,280,623
[45] Date of Patent: Jan. 18, 1994

[54] VERSATILE PERIPHERAL BUS

[75] Inventors: Martin Sodos, San Jose; Thomas Chan, Santa Clara, both of Calif.

[73] Assignee: Sun Microsystems, Inc., Mountain View, Calif.

[21] Appl. No.: 846,001

[22] Filed: Mar. 4, 1992

[51] Int. Cl.$^5$ .................. G06F 13/362; G06F 13/42
[52] U.S. Cl. .................. 395/325; 364/DIG. 1; 364/230.4; 364/242.92; 364/240.5; 364/240.8
[58] Field of Search .................. 395/325, 275

[56] References Cited

U.S. PATENT DOCUMENTS

| | | | |
|---|---|---|---|
| 4,476,527 | 10/1984 | Clayton | 395/275 |
| 4,837,785 | 6/1989 | McAlpine | 370/85.1 |
| 5,140,680 | 8/1992 | Best | 395/325 |
| 5,199,106 | 3/1993 | Bourke et al. | 395/275 |

Primary Examiner—Debra A. Chun
Attorney, Agent, or Firm—Blakely Sokoloff Taylor & Zafman

[57] ABSTRACT

An improved computer system bus is disclosed that transitions between addressed data transfers and handshake data transfers on the fly and that performs burst within dynamic data sizing during a data transfer sequence without prematurely terminating the sequence and that changes between synchronous and asynchronous data transfer sequences on the fly. These capabilities are accomplished by modifying the function of bus signal lines depending upon the type of transfer sequence undertaken. On the fly transition between addressed data transfer and handshake data transfer is accomplished by providing a set of DMA acknowledge signals and modifying their function according to the type of data transfer sequence underway. Burst within dynamic data sizing during a sequence is performed by taking advantage of burst transfer capabilities of the slave device, and the capability of the master device to modify data width on the fly. If the slave supports burst transfer, the bus master proceeds with a burst transfer sequence for the remaining portions of the data while shifting the data to accommodate the data width limitation of the slave device. On the fly transition between a synchronous transfer sequence and an asynchronous transfer sequence is accomplished by modifying the timing of bus acknowledge signals.

8 Claims, 5 Drawing Sheets

| SB0 | DB0 | SS0 | SM0 | SP0 | DS0 | DM0 | DP0 |
|---|---|---|---|---|---|---|---|
| SB1 | DB1 | SS1 | SM1 | SP1 | DS1 | DM1 | DP1 |
| SB2 | DB2 | SS2 | SM2 | SP2 | DS2 | DM2 | DP2 |
| SB3 | DB3 | SS3 | SM3 | SP3 | DS3 | DM3 | DP3 |
| SB4 | DB4 | SS4 | SM4 | SP4 | DS4 | DM4 | DP4 |
| SB5 | DB5 | SS5 | SM5 | SP5 | DS5 | DM5 | DP5 |
| SB6 | DB6 | SS6 | SM6 | SP6 | DS6 | DM6 | DP6 |
| SB7 | DB7 | SS7 | SM7 | SP7 | DS7 | DM7 | DP7 |

*Figure 5*

VERSATILE PERIPHERAL BUS

BACKGROUND OF THE INVENTION

1. Field of the Invention

This invention relates to the field of computer systems. More particularly, this invention relates to an improved bus for communication among the various devices of a computer system.

2. Art Background

In a computer system, communication between the processor or processors and the various peripherals devices is usually accomplished by transferring information over a set of signal lines commonly referred to as a "bus". A typical bus is comprised of data lines, control lines and address lines. A common method of communication over a bus is direct memory access (DMA). During a DMA transfer, one device assumes the role of bus master while another device takes the role of slave. The bus master controls the data and control lines of the bus in order to transfer data from master to slave (write sequence) or from slave to master (read sequence). DMA has the advantage of not requiring a central processor to perform the transfer. Many devices coupled to the bus can assume the role of bus master and perform a DMA transfer.

However, a compatibility problem arises because not all devices handle data transfer in the same manner. Some devices perform "addressed data transfer" wherein the device recognizes addresses on the address lines of the bus. Other devices do not monitor the address lines of the bus, but instead require "handshake data transfer" which involves a handshake protocol. Moreover, some devices will accommodate data transfer with data 64 bits wide, while other devices may only accommodate a data width of 32 bits, or 16 bits or even 8 bits. Also, some devices require a synchronous data transfer, while others require an asynchronous data transfer.

Computer buses currently available are unable to perform both addressed data transfers and handshake data transfers. For example, a bus designed to perform addressed data transfers is not able to accommodate a peripheral device that requires handshake data transfer. To attach a peripheral device requiring handshake data transfer to such a bus requires placement of extra circuitry between the bus and the peripheral device to interface the handshake data transfer protocol of the peripheral device with the addressed data transfer protocol of the bus. Similarly, a bus designed for handshake data transfer cannot accommodate a peripheral device requiring addressed data transfer without additional circuitry to interface the peripheral device to the bus.

Buses currently available that perform data transfers between devices of varying data width have the drawback of requiring at least one extra data transfer sequence to match the proper data width. Typically, the bus master attempts to transfer data having larger width than the slave can accommodate, which causes the slave to signal an acknowledgement indicating its correct port size for data transfer. The bus master then prematurely ends the data transfer sequence and attempts another sequence later with a narrower data width. Unfortunately, the prematurely terminated data transfer followed by later retrys slows data communication over the bus.

As will be described, the present invention provides an improved computer system bus that is capable of transition between addressed data transfers and handshake data transfers "on the fly." Moreover, the computer system bus of the present invention performs burst within dynamic sizing during data transfers without prematurely terminating a data transfer sequence, and performs both synchronous and asynchronous data transfers.

SUMMARY OF THE INVENTION

An improved computer system bus is disclosed that transitions between addressed data transfers and handshake data transfers "on the fly" without any intermediate reconfiguration steps. The improved computer system bus of the present invention also accomplishes burst within dynamic sizing during data transfers without prematurely terminating the data transfer sequence. Moreover, the present invention changes between synchronous and asynchronous data transfer sequences on the fly. These capabilities are accomplished by modifying the function of bus signal lines depending upon the type of transfer sequence undertaken.

On the fly transition between addressed data transfer and handshake data transfer is accomplished by providing a set of DMA acknowledge signals and modifying their function according to the type of data transfer sequence underway. During an addressed data transfer sequence, address lines are used to select the slave device, while the DMA acknowledge signals are used to indicate the end of transfer. During a handshake data transfer sequence, the DMA acknowledge signals, rather than the address lines, function as device select signals to select the slave device. In addition, transfer size signals indicate data size for an addressed data transfer sequence, but are unused for a handshake data transfer sequence.

Burst within dynamic data sizing during a data transfer sequence is performed by taking advantage of burst transfer capabilities of the slave device and the capability of the master device to modify data width on the fly. The master begins by driving the first piece of data onto the data lines. The slave device responds by driving bus acknowledge lines to indicate the size of data accepted by the slave. The slave device also asserts a burst enable line to indicate whether it can support burst transfers. If the slave supports burst transfer, the bus master proceeds with a burst transfer sequence for the remaining portions of the data, while shifting the data to accommodate the data width limitation of the slave device.

On the fly transition between a synchronous data transfer sequence and an asynchronous data transfer sequence is accomplished by modifying the timing of the bus acknowledge signals. During a synchronous data transfer sequence, the bus acknowledge signals are driven for one bus clock cycle by the slave device to acknowledge the data transfer. However, during an asynchronous data transfer sequence, the slave device drives the bus acknowledge signals for a period greater than one bus clock cycle to ensure the master device can sample bus acknowledge on a rising edge of bus clock.

BRIEF DESCRIPTION OF THE DRAWINGS

FIG 5. illustrates a channel control table which is maintained by each device capable of assuming the role of bus master.

DETAILED DESCRIPTION OF THE INVENTION

An improved computer system bus is described that performs both addressed data transfers and handshake data transfers and that transitions between addressed data transfers and handshake data transfers on the fly. The present invention also accomplishes burst within dynamic sizing during a data transfer sequence without prematurely terminating the sequence. Moreover, the present invention transitions between synchronous and asynchronous data transfers on the fly. In the following description for purposes of explanation, numerous details are set forth such as specific circuit components, circuit paths, etc., in order to provide a thorough understanding of the present invention. However, it will be apparent to one skilled in the art that these specific details are not required to practice the present invention. In other instances well known electrical structures and circuits are shown in order not to obscure the present invention unnecessarily.

Figure 1:
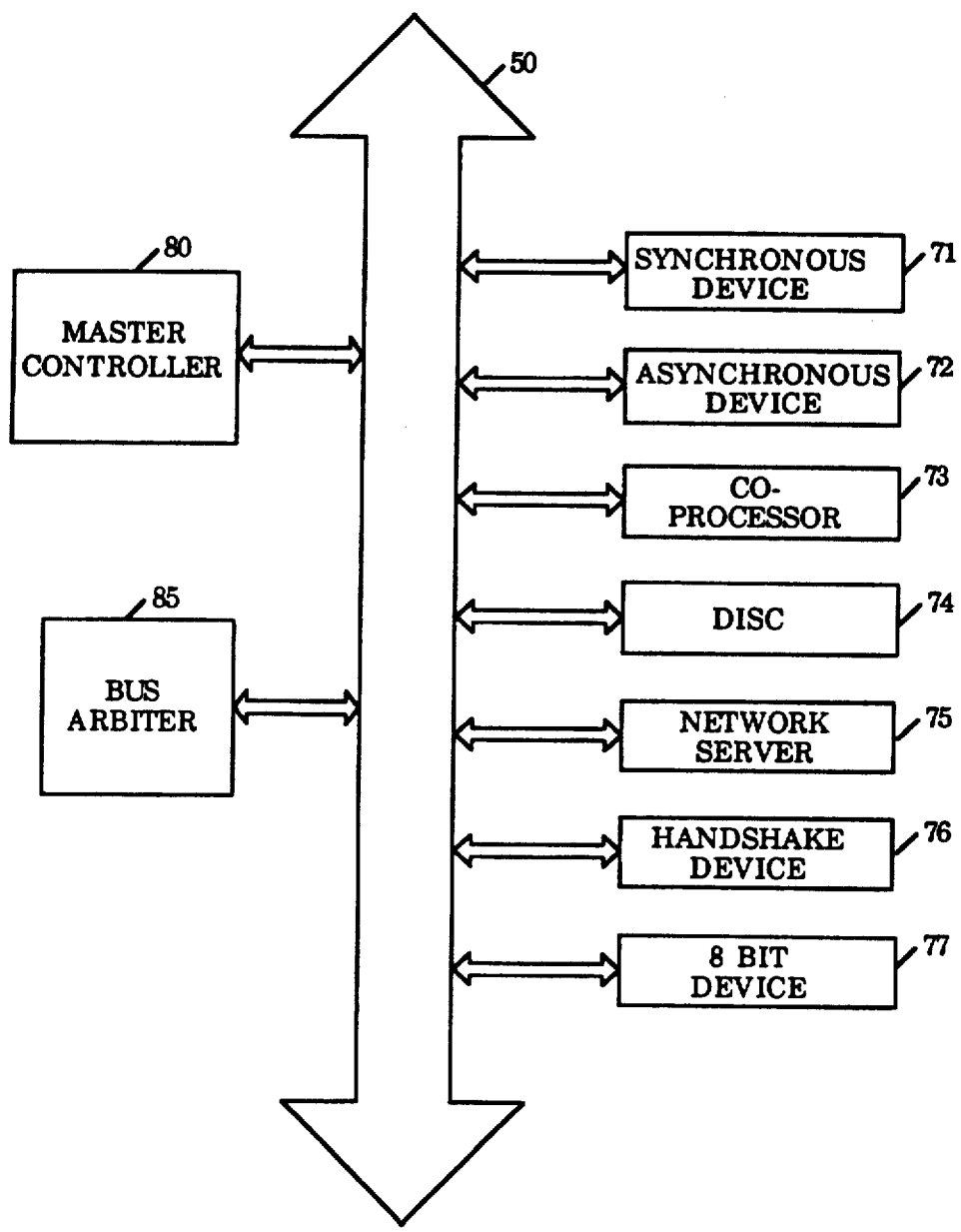
FIG. 1 is a schematic illustration of the present invention used for communication among various devices.

FIG. 1 illustrates the computer system bus of the present invention coupled for communication among a wide variety of devices. The computer system bus of the present invention is comprised of bus 50 along with master controller 80 and bus arbiter 85. FIG. 1 provides examples of the wide variety of devices that can communicate over bus 50. It should be noted that the present invention is not limited to the types of devices illustrated. For purposes of illustration, bus 50 is shown coupled to synchronous device 71, asynchronous device 72, coprocessor 73, disc device 74, network server 75, handshake device 76, and 8-bit device 77. In the present embodiment, any synchronous device having a 32 or 64 bit data width may assume the role of bus master.

Master controller 80 is intended to represent the functionality of any device capable of assuming the role of bus master on bus 50. Master controller 80 receives data transfer requests from devices 71-77, and in turn requests control of bus 50 through bus arbiter 85. Once arbiter 85 grants control of bus 50 to master controller 80, a data transfer sequence proceeds under control of master controller 80. Master controller 80 maintains channel control table 79 which defines a set of channel parameters for each device coupled to bus 50.

Referring to FIG. 5, an example channel control table 79 is illustrated. Each device capable of assuming the role of bus master maintains a channel control table that defines channel parameters for each communication channel provided by the computer bus of the present invention. In the current embodiment, a channel control table has eight entries, one for each of 8 communication channels. The first row of channel control table 79 provides channel parameters for channel 0 source and destination devices. Channel 0 parameters include SB0, DB0, SS0, SM0, SP0, DS0, DM0, and DP0. Likewise, channel 1 parameters are SB1, DB1, SS1, SM1, SP1, DS1, DM1, DP1, and so on for channels 0 thru 7.

In general, channel x parameters are provided by SBx, DBx, SSx, SMx, SPx, DSx, DMx, and DPx.

SBx is one bit indicating the type of data transfer sequence for the channel x source device, either an addressed data transfer sequence, or a handshake data transfer sequence. DBx is a one bit which indicates the type of data transfer sequence for the channel x destination device, either an addressed data transfer sequence, or a handshake data transfer sequence. SSx is one bit that selects synchronous or asynchronous data transfers for the channel x source device. SMx is one bit that selects multiplexed or non multiplexed data transfer for the channel x source device. SPx is a two bit indicator of the data port size for the channel x source device. DSx is one bit that selects synchronous or asynchronous data transfers for the channel x destination device. DMx is one bit that selects multiplexed or non multiplexed data transfer for the channel x destination device. DPx is a two bit indicator of the data port size for the channel x source device.

Master controller 80 accesses channel control table 79 to determine the type of transfer sequence required by a slave device in order to perform on the fly transitions between the various types of transfer sequences provided by the present invention. Based upon the information contained in channel control table 79, the master controller 80 modifies the function and timing of bus signals transmitted over bus 50.

Figure 2:
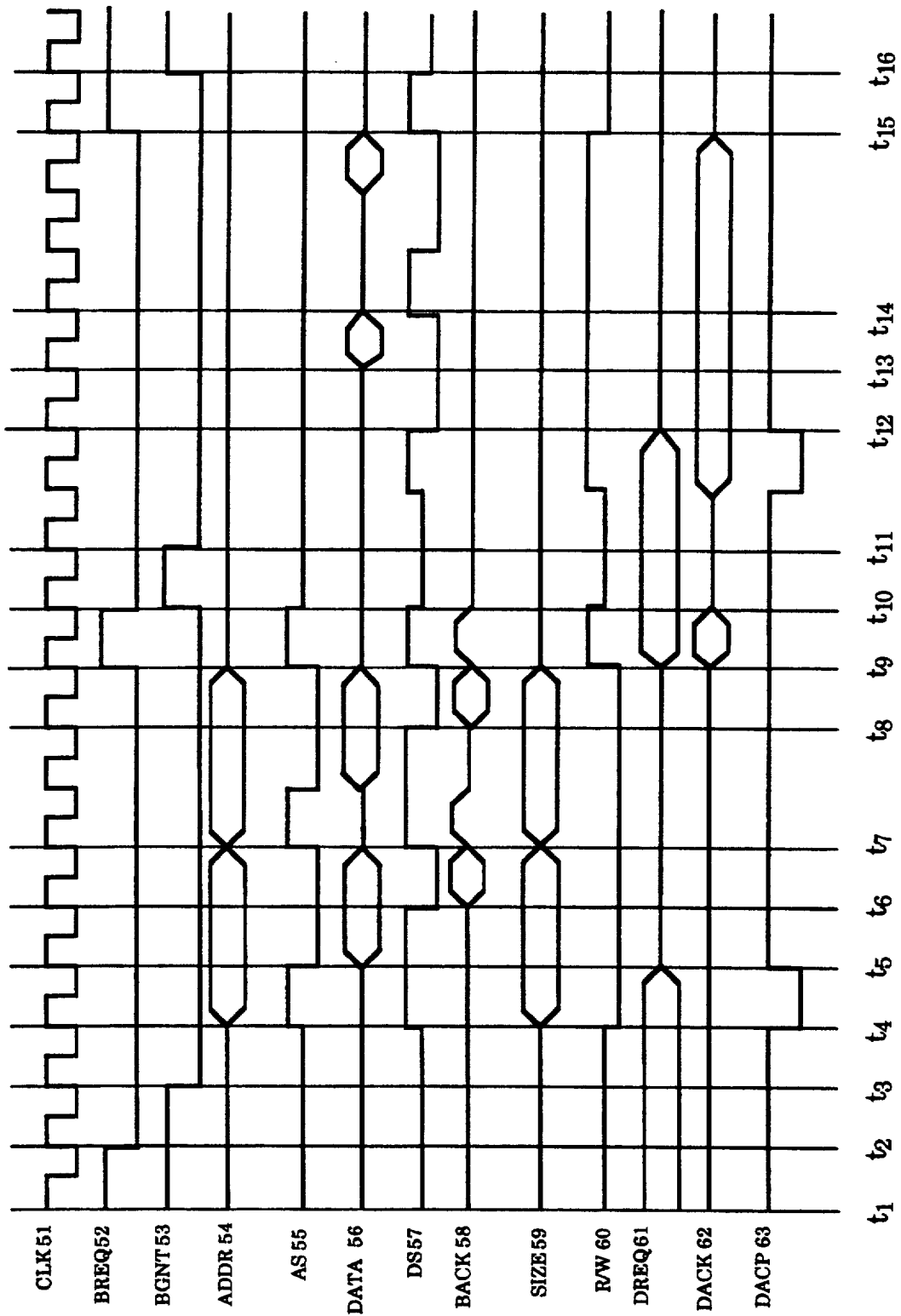
FIG. 2 is a timing diagram of a addressed data transfer sequence followed by a handshake protocol data transfer sequence.

FIG. 2 illustrates the timing for an on the fly transition from an addressed data transfer sequence to a handshake data transfer sequence. The figure shows a synchronous addressed write sequence from coprocessor 73 to synchronous device 71, followed by a synchronous handshake read sequence from handshake device 76 to network server 75. The devices designated are for purposes of illustration only. A wide variety of devices can assume the roles of master and slave to perform the data transfer sequences provided with the present invention. For the current embodiment of the present invention, it is preferable that on the fly transition between an addressed transfer sequence and a handshake transfer sequence be performed for DMA transfers, rather than other types of transfer sequences such as programmed I/O.

On the fly transition between addressed data transfer and handshake data transfer is accomplished by providing a set of DMA acknowledge 62 (DACK) signals and by modifying the function of DMA acknowledge 62 depending upon the type of data transfer sequence undertaken. During an addressed data transfer sequence, data on data 56 (DATA) is synchronized to data strobe 57 (DS) which signals valid data. DMA acknowledge 56 functions to indicate the end of transfer. During a handshake data transfer sequence, valid data on the data 56 is signalled by data strobe 57. However, DMA acknowledge 62 functions as a set of device select signals to select the slave device, rather than signal the end of transfer. In addition, transfer size 59 indicates the data size for addressed data transfer, but is not used for handshake data transfer.

The remaining bus signals provided in the current embodiment of the present invention include the bus clock 51 (CLK), bus request 52 (BREQ), bus grant 53 (GNT), the address lines 54 (ADDR), a address strobe 55 (AS), bus acknowledge 58 (BACK), read/write 60 (R/W), DMA request 61 (DREQ), and DMA accept 63 (DACP). In the timing diagram of FIG. 2, as well as FIGS. 3 and 4, the signals are illustrated having three distinct levels. The high level is indicative of a "logical one" and the low level is indicative of a "logical zero". The intermediate level between high and low indicates that the signal is in the high impedance state associated with tri-state control provided by the current embodiment.

Referring again to FIG. 2, an addressed write sequence from coprocessor 73 to synchronous device 71 will be described. The sequence begins at time t1, with synchronous device 71 requesting a data transfer by asserting DMA request 61. In the current embodiment, DMA request 61 is comprised of 4 bits with which a peripheral device can be identified. The state of DMA request 61 determines which of the 8 communication channels provided by the current embodiment of the present invention is used, and provides an index into channel control table 79. Coprocessor 73 responds to DMA request 61 one clock cycle later, at time t2, by asserting bus request 52 low. It should be noted that a bus master requires at least on clock cycle to respond to DMA request 61. Assuming bus 50 is not under the control of another device, bus arbiter 85 responds to bus request 52, at time t3, by asserting bus grant 53 low to grant control of bus 50 to coprocessor 73. Thus at time t3, coprocessor 73 becomes bus master. Coprocessor 73 holds bus request 52 low throughout the entire data transfer sequence. At time t4, coprocessor 73 asserts DMA accept 63 low to signal synchronous device 71 that DMA request 61 has been accepted. DMA accept 63 causes synchronous device 71 to terminate the DMA request 61 at time t5.

The transfer of the first piece of data begins at time t4, when the bus master, in this example coprocessor 73, drives the desired address onto address lines 54, asserts transfer size 59 to indicate data size for the transfer, and asserts read/write 60 low indicating a write sequence. In current embodiment, data transfer sizes range from one byte to 128 bytes. One clock cycle later, at time t5, the bus master asserts a high to low transition of address strobe 55 to signal that a valid address is on bus 50. The bus master drives the first piece of data onto data lines 56 at time t5, and asserts data strobe 57 low at time t6 to indicate that the data on data lines 56 is valid. In the current embodiment, data lines 56 comprise 32 signal lines that accommodate a 32-bit data value. The slave device, in this example synchronous device 71, examines address lines 54 and acknowledges the first piece of data by asserting bus acknowledge 58 at time t6. The bus master then deasserts data lines 56, data strobe 57, address lines 54, and address strobe 55 at time t7. Time t7 marks the completion of transfer for the first piece of data for the addressed write sequence. The bus master then immediately drives out the next desired address on address lines 54 to begin transferring the next piece of data. The timing sequence from time t4 through time t7 is repeated for each piece of transferred during the addressed data transfer sequence. At time t9, coprocessor 73 deasserts bus request 52. In response, bus arbiter 85 deasserts bus grant 53 at time t10, thus terminating the addressed transfer sequence. Also at time t9, DMA acknowledge 62 is asserted to signal the end of the data transfer sequence. At time t9, before the above transfer sequence is complete, a new device, in this example handshake device 76, requests a data transfer by asserting DMA request 61.

The handshake read sequence from handshake device 76 to network server 75 begins at time t10 when network server 75 asserts bus request 52 low. In response, bus arbiter 85 asserts bus grant 53 low one clock cycle later at time t11, thereby granting control of bus 50 to network server 75. Thus, network server 75 assumes the role of bus master at time t11. One bus clock 51 cycle later, network server 75 asserts DMA accept 63 low to indicate acceptance of DMA request 61, and asserts DMA acknowledge 62 to indicate which handshake device is the desired slave. In the current embodiment, DMA acknowledge 62 is comprised of 4 signal lines. Also one bus clock 51 cycle after time t11, the bus master asserts read/write 60 high to signal the slave device that a read operation is occurring. At time t12, the master device deasserts DMA request 61. Data size 59 is not asserted for a handshake data transfer sequence.

Data transfer begins when the bus master drives data strobe 57 low at time t12. The slave device, in this example handshake device 76, drives out the first piece data onto data lines 56 at time t13. The bus master reads the data on the rising edge of data strobe 57 at time t14. Taking into account signal delay time, the data is still available on data lines 56 at time t14. The handshake sequence from time t12 through time t14 repeats for each piece of data transferred during the handshake read sequence. At time t15, as the last piece of data being read by the bus master, network server 75 deasserts bus request 52. In response, bus arbiter 85 deasserts bus grant 53 at time t16, thus signaling the end of the synchronous handshake read sequence.

Figure 3:
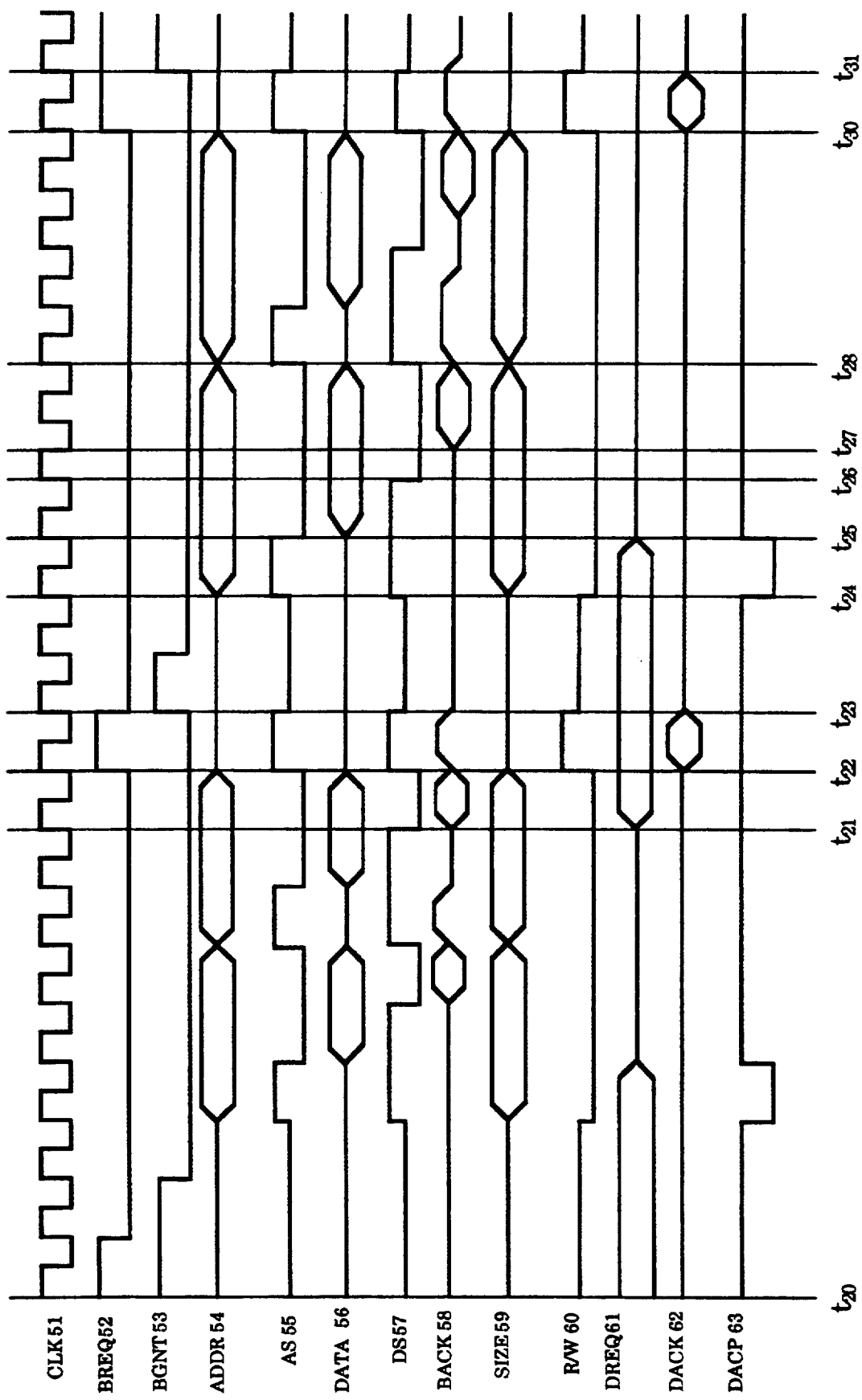
FIG. 3 is a timing diagram of a synchronous data transfer sequence followed by an asynchronous data transfer sequence.

FIG. 3 illustrates an on the fly transition between a synchronous transfer sequence and an asynchronous transfer sequence. On the fly transition is accomplished by accessing channel control table 79 to determine the type of transfer sequence the requesting device supports, and by modifying the timing of bus acknowledge 58. During a synchronous transfer sequence, bus acknowledge 58 is driven for one cycle of bus clock 51 by the slave device to acknowledge the data transfer. During an asynchronous data transfer sequence, the slave device drives the bus acknowledge 58 for a period greater than one cycle of bus clock 51 to ensure the master device can sample bus acknowledge on a rising edge of bus clock 51.

FIG. 3 illustrates a synchronous write sequence, followed by an asynchronous write sequence from coprocessor 73 to asynchronous device 72. As above, the device designations are only for the purposes of illustration. The synchronous write sequence starts at time t20 and ends at time t22, when DMA acknowledge 62 is asserted to signal the end of the previous data transfer sequence. The transfer sequence from time t20 through time t22 is identical to that described above in the sequence from time t1 to time t9.

At time t21, asynchronous device 72 begins requesting a transfer even before the previous transfer has completed by asserting DMA request 61. At time t23, coprocessor 73 requests control of the bus to accommodate the requested transfer by asserting bus request 52 low. One clock cycle later, bus arbiter 85 responds by asserting bus grant 53 low to grant control of the bus to coprocessor 73. At time t24, coprocessor 73 asserts DMA accept 63 low to signal acceptance of the transfer request. Also at time t24, the bus master, in this example coprocessor 73, drives out the desired address on address lines 54, signals the data size by asserting transfer size 59, and signals a write sequence by asserting read/write 60 low. The bus master then, at time 25, asserts address strobe 55 low and drives the first piece of data onto data lines 56.

Since this transfer sequence is asynchronous, bus clock 51 is not sampled by the slave device, which in this example is asynchronous device 72. The bus master signals the slave device that data is available by asserting data strobe 57 low at time t26. The slave device responds at time t27 by asserting bus acknowledge 58 indicating that the first piece of data has been accepted. The slave drives bus acknowledge 58 for a period greater than one clock cycle in order to ensure that the bus master will sample bus acknowledge 58 on the rising edge of bus clock 51. At time t28, the bus master deasserts data lines 56 and data strobe 57. Also at time t28, the bus master drives out the next desired address onto address lines 54. The data write sequence from time t24 through time t28 is repeated for each piece of data transferred during the asynchronous write sequence. DMA acknowledge 62 is asserted at time t30 to signal the end of the sequence.

Figure 4:
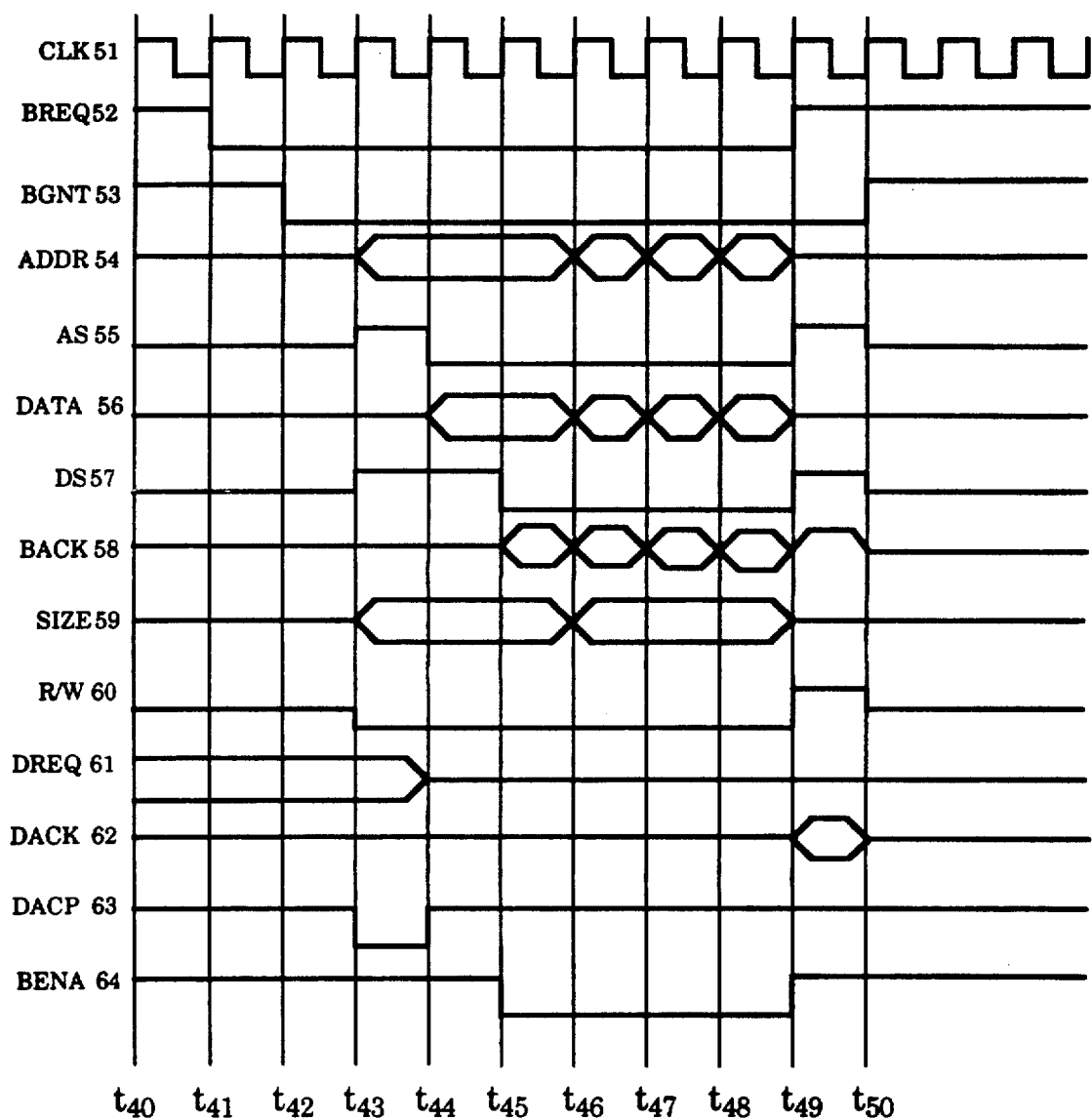
FIG. 4 is a timing diagram illustrating the burst within dynamic sizing feature of the present invention.

FIG. 4 illustrates the burst within dynamic sizing feature of the present invention. Burst within dynamic data sizing during a transfer sequence is performed by providing transfer size 59 signals which indicate the data size for the transfer sequence and by taking advantage of burst transfer capabilities of the slave device, and the capability of the master device to modify data width on the fly. When a master drives the first piece of data onto the data 56, it also drives transfer size 59 to indicate the size of the data for the transfer sequence. The slave device responds by driving bus acknowledge 58 to indicate the size of data accepted by the slave. The slave device also asserts a burst enable 64 (BENA) to indicate whether it can support burst transfers. If the slave supports burst transfer, the bus master proceeds with a burst transfer sequence for the remaining portions of the data while shifting the data to accommodate the data width limitation of the slave device.

In the example of FIG. 4, a write of 32 bits of data from coprocessor 73 is attempted to 8-bit device 77, which only accepts data 8 bits wide. 8-bit device 77 requests data transfer prior to time t40 by asserting DMA request 61, which causes coprocessor 73 to assert bus request 53 low at time t41. Assuming bus 50 is not controlled by another device, bus arbiter 85 asserts bus grant 53 low at time t42, thereby granting control of bus 50 to coprocessor 73, which becomes bus matter. At time t43, coprocessor 73 asserts DMA accepts 63 low to signal that the transfer request has been accepted. Also at time t43, the bus master asserts the desired address onto address lines 54 and asserts transfer size 59 to indicate that 32 bits of data is being transferred. At time t44, the bus master asserts address strobe 55 low and drives the data onto data lines 56. The bus master then asserts data strobe 57 low at time t45 indicating to the slave device that valid data is available. The sleeve device, in this example 8-bit device 77, responds by driving bus acknowledge 58 to indicate that only 8 bits of data is accepted. Also at time t45, the slave device asserts burst enable 64 (BENA) low indicating that it is capable of handling burst transfers of data. If the slave device does not assert burst enable 64 low at time t45, the transfer sequence will terminate, resulting in a later data transfer sequence to transfer remaining data. With burst enable 64 asserted at time t45, the bus master proceeds to transfer the remaining three 8 bit portions of data at time t46, time t47 and time t48. At times t46 through t49, transfer size 59 indicates that 8 bit wide data is being driven onto data lines 56. Coprocessor 73 deasserts bus request 52 at time t49, which causes bus arbiter 85 to deassert bus grant 53, thus ending the data transfer sequence. Also at time t49, DMA acknowledge 62 signals the end of the transfer sequence.

The present invention has application for use in high speed digital computer environments and may be incorporated into a variety of device communication systems. Although the present invention has been described in conjunction with the embodiments illustrated in FIGS. 1 through 5, it is evident that numerous alternatives, modifications, variations and uses will be apparent to those skilled in the art in light of the foregoing description.

What is claimed is:

1. A method for communicating over a bus in a computer system, comprising the steps of:
    (a) sensing a data transfer request signal from a slave device coupled to the bus, and then asserting a bus request signal to a bus arbiter coupled to the bus, the bus request signal causing the bus arbiter to transfer a bus grant signal over the bus;
    (b) sensing the bus grant signal from the bus arbiter, then transferring a data transfer accept signal to the slave device over a data transfer accept portion of the bus;
    (c) reading a channel control table containing a set of channel parameters for the slave device, the channel parameters indicating whether the slave device performs an addressed transfer sequence or a handshake transfer sequence;
    (d) if the slave device performs the addressed transfer sequence, then transferring at least one address to the slave device over an address portion of the bus and transferring at least one data value to the slave device over a data portion of the bus, and then transferring an end of data transfer signal to the slave device over a data acknowledge portion of the bus;
    (e) if the slave device performs the handshake transfer sequence, then transmitting a slave device select signal to the slave device over the data acknowledge portion of the bus and transferring the data values to the slave device over the data portion of the bus.

2. The method of claim 1, wherein the channel parameters further indicate whether the slave device performs a synchronous transfer or an asychrounous transfer.

3. The method of claim 2, wherein the steps of transferring at least one address to the slave device over an address portion of the bus and transferring at least one data value to the slave device over a data portion of the bus in step (d) comprises the steps of:
    generating a bus clock signal and transmitting the bus clock signal over a clock signal portion of the bus;
    transferring the address to the slave device over the address portion of the bus, the address synchronized by the bus clock signal;
    transferring the data value to the slave device over the data portion of the bus, the data value synchronized by the bus clock signal;
    if the slave device performs the synchronous transfer, then sensing a bus acknowledge signal from the slave device over a bus acknowledge portion of the bus, the slave device asserting the bus acknowledge signal for a time period substantially equal to a period of the bus clock signal, the bus acknowledge signal indicating that the slave device received the data value;

if the slave device performs the asynchrounous transfer, then sampling the bus acknowledge signal on an edge of the bus clock signal, the slave device asserting the bus acknowledge signal for the time period greater than the period of the bus clock signal.

4. The method of claim 2, wherein the steps of transferring at least one address to the slave device over an address portion of the bus and transferring at least one data value to the slave device over a data portion of the bus in step (d) comprises the steps of:

(a) transferring the address to the slave device over the address portion of the bus;
  (b) transferring the data value to the slave device over the data portion of the bus, while transferring a size signal to the slave device over a data size portion of the bus, the size signal indicating that the data value comprises m bytes, where m is a multiple of 2;
  (c) sensing the bus acknowledge signal from the slave device over the bus acknowledge portion of the bus, the bus acknowledge signal indicating that the slave device accepts s bytes of data;
  (d) if s is less than m, then sensing a burst enable signal from the slave device over a burst enable portion of the bus, the burst enable signal indicating that the slave device performs a burst data transfer;
  (e) if s is less than m, shifting the data value by s bytes toward a least significant byte of the data value;
  (f) if s is less than m, transferring an updated address corresponding to the data value to the slave device, and transferring the data value to the slave device, while transferring the size signal to the slave device, the size signal indicating that the data value comprises s bytes;
  (g) if s is less than m, sensing the bus acknowledge signal from the slave device;
  (h) if s is less than m, repeating steps (e) through (g) (m/s−2) times to complete a transfer of m bytes of the data value to the slave device.

5. An apparatus for communicating over a bus in a computer system, comprising:

circuit for sensing a data transfer request signal from a slave device coupled to the bus, and then asserting a bus request signal to a bus arbiter coupled to the bus, the bus request signal causing the bus arbiter to transfer a bus grant signal over the bus;
  circuit for sensing the bus grant signal from the bus arbiter, then transferring a data transfer accept signal to the slave device over a data transfer accept portion of the bus;
  circuit for reading a channel control table containing a set of channel parameters for the slave device, the channel parameters indicating whether the slave device performs an addressed transfer sequence or a handshake transfer sequence;
  circuit for transferring at least one address to the slave device over an address portion of the bus and transferring at least one data value to the slave device over a data portion of the bus, and then transferring an end of data transfer signal to the slave device over a data acknowledge portion of the bus, if the slave device performs the addressed transfer sequence;
  circuit for transmitting a slave device select signal to the slave device over the data acknowledge portion of the bus and transferring the data values to the slave device over the data portion of the bus, if the slave device performs the handshake transfer sequence.

6. The apparatus of claim 5, wherein the channel parameters further indicate whether the slave device performs a synchronous transfer or an asynchrounous transfer.

7. The apparatus of claim 6, wherein the circuit for transferring at least one address to the slave device over an address portion of the bus and transferring at least one data value to the slave device over a data portion of the bus comprises:

circuit for generating a bus clock signal and transmitting the bus clock signal over a clock signal portion of the bus;
  circuit for transferring the address to the slave device over the address portion of the bus, the address synchronized by the bus clock signal;
  circuit for transferring the data value to the slave device over the data portion of the bus, the data value synchronized by the bus clock signal;
  circuit for sensing a bus acknowledge signal from the slave device over a bus acknowledge portion of the bus, the slave device asserting the bus acknowledge signal for a time period substantially equal to a period of the bus clock signal, the bus acknowledge signal indicating that the slave device received the data value, if the slave device performs the synchronous transfer;
  circuit for sampling the bus acknowledge signal on an edge of the bus clock signal, the slave device asserting the bus acknowledge signal for the time period greater than the period of the bus clock signal, if the slave device performs the asynchrounous transfer.

8. The apparatus of claim 6, wherein the circuit for transferring at least one address to the slave device over an address portion of the bus and transferring at least one data value to the slave device over a data portion of the bus comprises:

circuit for transferring the address to the slave device over the address portion of the bus;
  circuit for transferring the data value to the slave device over the data portion of the bus, while transferring a size signal to the slave device over a data size portion of the bus, the size signal indicating that the data value comprises m bytes, where m is a multiple of 2;
  circuit for sensing the bus acknowledge signal from the slave device over the bus acknowledge portion of the bus, the bus acknowledge signal indicating that the slave device accepts s bytes of data;
  circuit for sensing a burst enable signal from the slave device over a burst enable portion of the bus if s is less than m, the burst enable signal indicating that the slave device performs a burst data transfer;
  circuit for shifting the data value by s bytes toward a least significant oyte of the data value, if s is less than m;
  circuit for transferring an updated address corresponding to the data value to the slave device, and transferring the data value to the slave device, while transferring the size signal to the slave device, the size signal indicating that the data value comprises s bytes, if s is less than m.

* * * * *